(12) United States Patent
Yang et al.

(10) Patent No.: US 11,132,521 B2
(45) Date of Patent: Sep. 28, 2021

(54) DISPLAY DEVICE AND MOBILE TERMINAL

(71) Applicant: GUANGDONG OPPO MOBILE TELECOMMUNICATIONS CORP., LTD., Guangdong (CN)

(72) Inventors: Le Yang, Guangdong (CN); Haiping Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 61 days.

(21) Appl. No.: 16/675,771

(22) Filed: Nov. 6, 2019

(65) Prior Publication Data

US 2020/0074141 A1    Mar. 5, 2020

Related U.S. Application Data

(63) Continuation of application No. PCT/CN2018/085211, filed on Apr. 28, 2018.

(30) Foreign Application Priority Data

May 12, 2017  (CN) .......................... 201710341780.X (51) Int. Cl.
  *G06K 9/00*   (2006.01)
  *G06F 1/16*   (2006.01)
  *H04M 1/02*   (2006.01)

(52) U.S. Cl.
  CPC ....... *G06K 9/00013* (2013.01); *G06F 1/1626* (2013.01); *G06F 1/1652* (2013.01); *G06K 9/0002* (2013.01); *H04M 1/0268* (2013.01)

(58) Field of Classification Search
  CPC ............. G06K 9/00013; G06K 9/0002; G06F 1/1626; G06F 1/1652; G06F 1/1637;
  (Continued)

(56) References Cited

U.S. PATENT DOCUMENTS

2011/0227848 A1   9/2011   Furusawa
2017/0220838 A1*  8/2017   He ......................... G06F 3/044
2018/0366661 A1   12/2018  Wang et al.

FOREIGN PATENT DOCUMENTS

CN       104036172      9/2014
CN       104779222      7/2015
           (Continued)

OTHER PUBLICATIONS

EPO, Office Action for EP Application No. 18798459.6, dated Apr. 20, 2020.

(Continued)

*Primary Examiner* — Abhishek Sarma
(74) *Attorney, Agent, or Firm* — Hodgson Russ LLP (57) ABSTRACT

The present disclosure provides a display device and a mobile terminal. The display device includes a display panel, a fingerprint identification module, and a spacer. The display panel includes a display surface and a rear surface opposite to the display surface; the display surface defines a display region for displaying images. The fingerprint identification module is spaced apart from the rear surface, and configured to identify fingerprint information received by the display region. The spacer is attached to the rear surface and sandwiched between the display panel and the fingerprint identification module. The spacer is a transmission medium for allowing a detecting signal that is emitted by the fingerprint identification module to pass through, and allowing the detecting signal after being reflected by an object outside to pass through.

20 Claims, 6 Drawing Sheets

(58) Field of Classification Search
CPC ..... G06F 1/1684; H04M 1/0268; H04M 1/67; H04M 1/026; H04M 1/0266
See application file for complete search history.

(56) References Cited

FOREIGN PATENT DOCUMENTS

| | | |
|---|---|---|
| CN | 105094227 | 11/2015 |
| CN | 205656556 | 10/2016 |
| CN | 205721719 | 11/2016 |
| CN | 205809952 | 12/2016 |
| CN | 106304848 | 1/2017 |
| CN | 205983304 | 2/2017 |
| CN | 107256067 | 10/2017 |
| GN | 106558279 | 4/2017 |

OTHER PUBLICATIONS

SIPO, Decision of Rejection for CN Application No. 201710341780.X, dated Feb. 3, 2020.
SIPO, Third Office Action for CN Application No. 201710341780.X, dated Nov. 19, 2019.
SIPO, Fourth Office Action for CN Application No. 201710341780.X, dated Aug. 27, 2020.
WIPO, ISR for PCT/CN2018/085211, dated Jul. 16, 2018.
SIPO, First Office Action for CN Application No. 201710341780.X, dated Mar. 4, 2019.
SIPO, Second Office Action for CN Application No. 201710341780.X, dated Aug. 8, 2019.
IPI, Office Action for IN Application No. 201917046185, dated Apr. 28, 2021.

* cited by examiner

DISPLAY DEVICE AND MOBILE TERMINAL

CROSS-REFERENCE TO RELATED APPLICATIONS

This application is a continuation of International Application No. PCT/CN2018/085211, filed on Apr. 28, 2018, which claims priority to Chinese Patent Application No. 201710341780.X, filed on May 12, 2017, the entire disclosures of which are incorporated herein by reference.

TECHNICAL FIELD

The present disclosure relates to the field of electronic devices in general. More particularly, and without limitation, the disclosed embodiments relate to a display device and a mobile terminal.

BACKGROUND

With the development of technology, mobile terminals such as mobile phones and tablet computers are mainly locked/unlocked by fingerprint information. The mobile terminals may provide a fingerprint identification region in a display panel thereof, and the fingerprint identification region is generally in the same plane as a display region of the display panel. Thus the fingerprint identification region may occupy display area of the mobile terminal, which is not conducive to the realization of large display area of the mobile terminal.

SUMMARY

In accordance with an aspect, the present disclosure provides a display device. The display device includes a display panel, a fingerprint identification module, and a spacer. The display panel includes a display surface and a rear surface opposite to the display surface; the display surface defines a display region for displaying images. The fingerprint identification module is spaced apart from the rear surface, and configured to identify fingerprint information received by the display region. The spacer is attached to the rear surface and sandwiched between the rear surface and the fingerprint identification module. The spacer is a transmission medium for allowing a detecting signal that is emitted by the fingerprint identification module to pass through, and allowing the detecting signal after being reflected by an object outside to pass through.

In accordance with another aspect, a mobile terminal is provided. The mobile terminal includes a housing, a display panel, fingerprint identification module, and a spacer. The display panel is connected to the housing. The display panel and the housing corporately define a receiving cavity. The display panel includes a display surface and a rear surface facing the receiving cavity and opposite to the display surface. The display surface defines a display region for displaying images. The fingerprint identification module is disposed in the receiving cavity and spaced apart from the rear surface, and configured to identify fingerprint information received by the display region. The spacer is attached to the rear surface and sandwiched between the display panel and the fingerprint identification module. The spacer is transmission medium for allowing a detecting signal emitted by the fingerprint identification module to pass through.

In accordance with still another aspect, a display device is provided. The display device includes a display panel, a spacer, and a finger fingerprint identification module. The display panel includes a display surface and a rear surface opposite to the display surface. The display surface defines a display region for displaying images. The spacer is attached to the rear surface and corresponding to the display region. The fingerprint identification module is attached to a side of the spacer far away from the rear surface. At least a partial portion of the display region is light-transmitting and the spacer is a transmission medium for a detecting signal emitted by the fingerprint identification module to pass through.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION

The technical solutions in the embodiments of the present disclosure will be clearly and completely described in the following with reference to the drawings in the embodiments of the present disclosure.

The mobile terminal 100 may be any device having communication and storage functions, such as a tablet computer, a mobile phone, an e-reader, a remote controller, a personal computer (PC), a notebook computer, an in-vehicle device, a network basing TV, a wearable device, and other smart devices with network functions, in accordance with the embodiments of the present disclosure.

Figure 1:
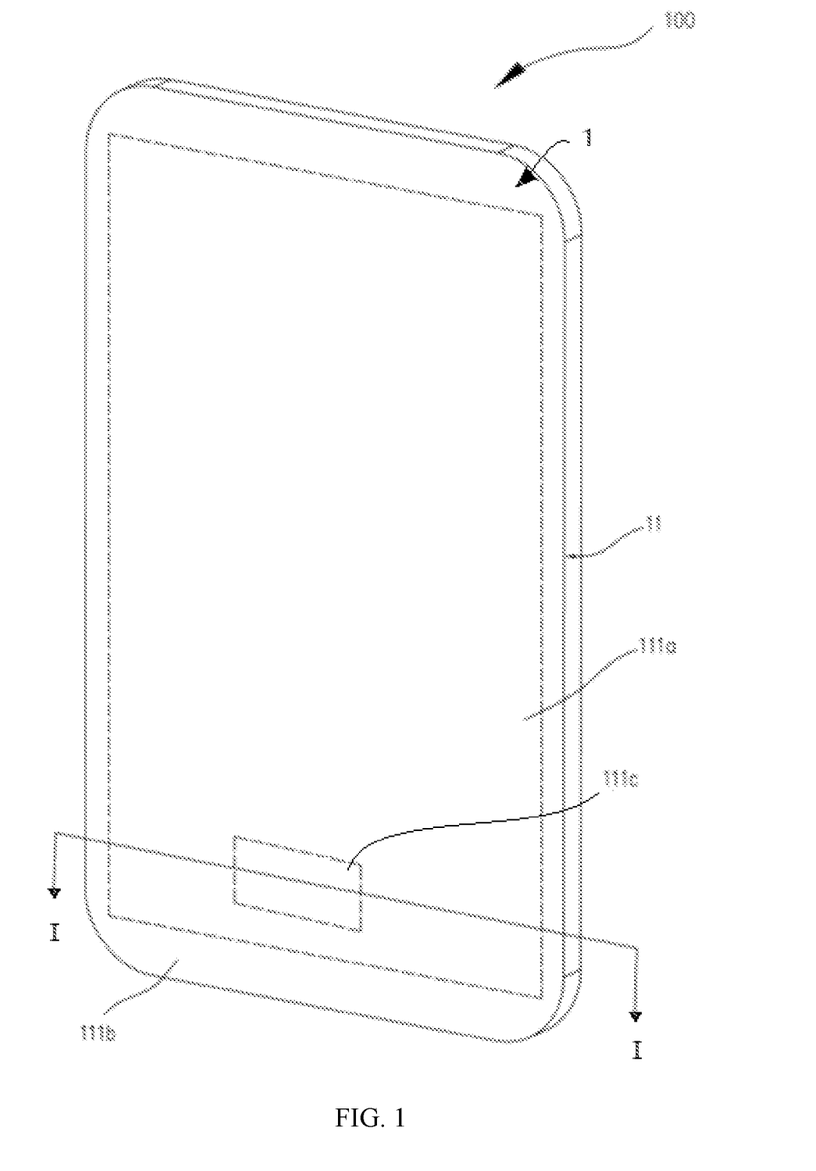
FIG. 1 illustrates a schematic view of a mobile terminal, in accordance with an embodiment of the present disclosure.
Figure 2:
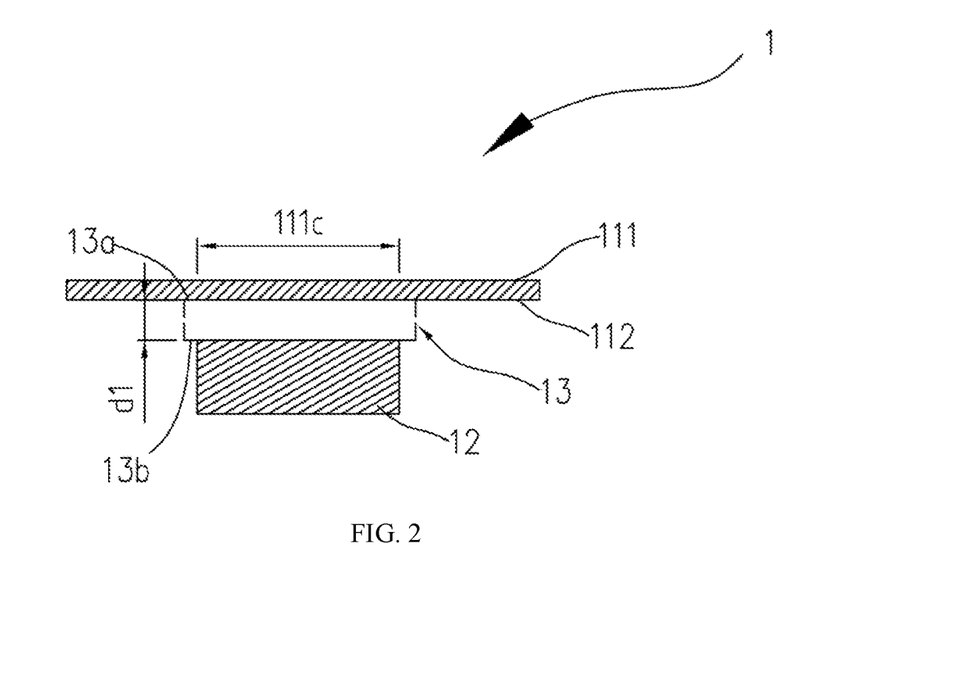
FIG. 2 illustrates a cross-sectional view of a display device of the mobile terminal of FIG. 1, taken along a line I-I.

As illustrated in FIG. 1 and FIG. 2, a mobile terminal 100 is provided, in accordance with a first embodiment of the present disclosure. The mobile terminal 100 includes a display device 1. The display device 1 includes a display panel 11, a fingerprint identification module 12, and a spacer 13. The display panel 11 includes a display surface 111 and a rear surface 112 opposite to the display surface 111. The display surface 111 includes a display region 111a for displaying images. The spacer 13 is attached to the rear surface 112 of the display panel 11. The spacer 13 is configured to separate the fingerprint identification module 12 from the rear surface 112 of the display panel 11. The fingerprint identification module 12 is configured to identify fingerprint information received by the display region 111a.

It can be understood that, because the fingerprint identification module 12 may include a chip, the fingerprint identification module 12 is attached to the display panel 11 by applying a heat-pressing process when the fingerprint identification module 12 is directly connected with the rear surface 112 of the display panel 11. However, the heat-pressing process may damage the display panel 11, and after the fingerprint identification module 12 is attached to the display panel 11, wrinkles may be generated at a connection of the fingerprint identification module 12 and the display panel 11, which may result in an incline to the fingerprint identification module 12 with respect to the display panel 11. This problem becomes more prominent when the display panel 11 is a flexible display panel such as an OLED (Organic Light-Emitting Diode) display panel.

Because the flexible display panel is soft, a connection structure of the fingerprint identification module 12 and the flexible display panel is more likely to bring wrinkles at the connection of the flexible display panel and the fingerprint identification module 12. The wrinkles may result in a large included angle between the flexible display panel and the fingerprint identification module 12. When the fingerprint identification module 12 is a device that requires a small included angle between the flexible display panel and the fingerprint identification module 12 to ensure that the fingerprint identification module 12 may identify a fingerprint accurately, such as an optical fingerprint identification device. In this case, an accuracy of a fingerprint identification of the fingerprint identification module 12 is relatively low when there are wrinkles between the flexible display panel and the fingerprint identification module 12. Therefore, the fingerprint identification module 12 is disposed apart from the rear surface 112 of the display panel 11 by disposing the spacer 13 between the fingerprint identification module 12 and the display panel 11. So that the fingerprint identification module 12 can be fixed in the mobile terminal 100 to identify the fingerprint information received by the display region 111a, and can be separated from the display panel 11. Thus the fingerprint identification module 12 is maintained to be parallel to the display panel 11, and the accuracy of fingerprint identification is improved.

It can be understood that the display panel 11 is taken a flexible display panel capable of flexible bending as an example, in the illustrated embodiment. In other embodiments, the display panel 11 can also be a hard screen such as the liquid crystal display.

In the illustrated embodiment, as illustrated in FIG. 1 and FIG. 2, the display panel 11 is capable of displaying images and receiving a touch input to generate an instruction, that is, the display panel 11 has a display function and a touch function. The display surface 111 of the display panel 11 includes a display region 111a for displaying images and a non-display region 111b. The display region 111a is also capable of receiving fingerprint information, thus there is no necessary to provide a special region on the non-display region 111b of the display surface 111 to receive the finger information. Thus an area of the non-display region 111b may be smaller than a traditional one that having a special region to receive the finger information. A ratio of the non-display region 111b to the display surface 111 is relatively small. In other embodiments, display panel 11 may only have a display function.

It can be understood that, as illustrated in FIG. 2, the fingerprint identification module 12 is an optical fingerprint identification device. The optical fingerprint identification device can emit a detecting light passing through the display panel 11 to the outside, and can receive the detecting light after being reflected by a fingerprint texture of a user when the user touches the display panel with a finger, wherein the detecting light after being reflected indicates fingerprint information. The display region 111a may define a fingerprint receiving region 111c to receive the fingerprint information. The fingerprint receiving region 111c allows the user to touch and input the fingerprint information. The fingerprint receiving region 111c is a region of the display region 111a, which is corresponding to an orthographic projection region of the fingerprint identification module 12 when the fingerprint identification module 12 is projected on the display region 111a. The user can press the fingerprint texture in the fingerprint receiving region 111c, thus the fingerprint identification module 12 may identify the fingerprint texture of the user, and allow user to control the mobile terminal 100, such as unlocking. In other embodiments, the fingerprint identification module 12 can also be an ultrasonic fingerprint identification device. The ultrasonic fingerprint identification device may detect and identify the fingerprint texture by emitting and receiving ultrasonic waves.

Furthermore, as illustrated in FIG. 2, a distance d1 between the fingerprint identification module 12 and the rear surface 112 of the display panel 11 is greater than or equal to 0.1 mm. Particularly, the distance d1 between the fingerprint identification module 12 and the rear surface 112 of the display panel 11 is 0.2 mm. The fingerprint identification module 12 is ensured to not directly connected to the display panel 11, and accurately detect the fingerprint information that is received by the display region 111a, when the distance d1 between the fingerprint identification module 12 and the rear surface 112 of the display panel 11 is 0.2 mm. In other embodiments, the distance d1 between the fingerprint identification module 12 and the display panel 11 may also be 0.1 mm, 0.3 mm, etc.

In the illustrated embodiment, as illustrated in FIG. 2, the spacer 13 is disposed on the rear surface 112 of the display panel 11. The spacer 13 is configured to ensure that the fingerprint identification module 12 and the rear surface 112 of the display panel 11 is spaced apart. Particularly, the spacer 13 includes a first end surface 13a and a second end surface 13b opposite to the first end surface 13a. The first end surface 13a of the spacer 13 faces the rear surface 112 of the display panel 11. The second end surface 13b faces the fingerprint identification module 12. The first end surface 13a is fixed on the rear surface 112 of the display panel 11. The second end surface 13b is connected to the fingerprint identification module 12. A thickness of the spacer 13 is corresponding to the distance d1 between the fingerprint identification module 12 and the rear surface 112 of the display panel 11. The distance d1 between the fingerprint identification module 12 and the rear surface 112 is equal to the thickness of the spacer 13.

It can be understood that an angle between an end surface of the spacer 13, which is connected to the rear surface 112, and another end surface of the spacer 13, which is connected to the fingerprint identification module 12, is less than 5°. That is, an included angle between the first end surface 13a and the second end surface 13b is less than 5°. Particularly, the included angle between the first end surface 13a and the second end surface 13b is 0°. That is, the first end surface 13a is parallel to the second end surface 13b, thereby ensuring an accurate of detection and identification for fingerprint information.

Figure 3:
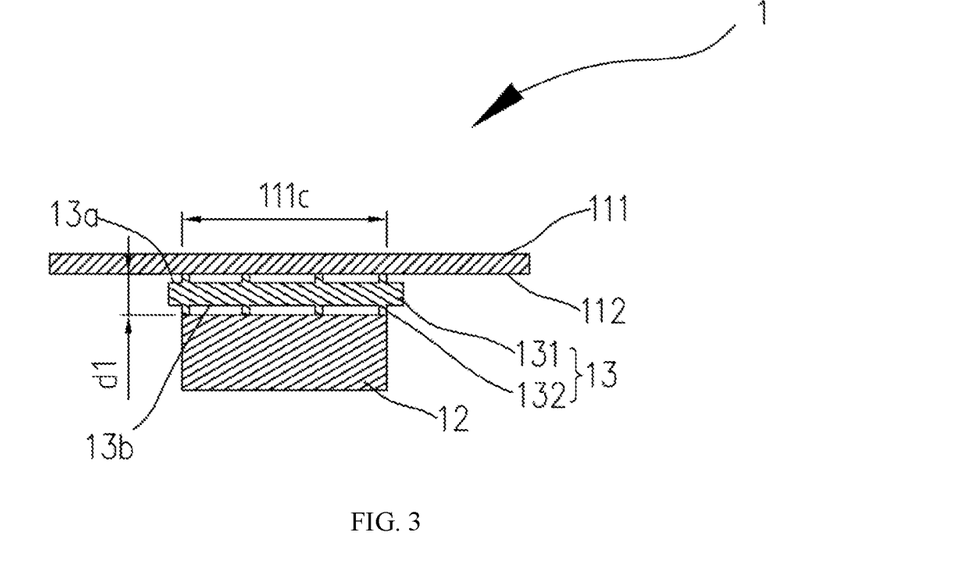
FIGS. 3 to 5 illustrate schematic cross-sectional views of the display device of FIG. 2.

In one embodiment, as illustrated in FIG. 3, the spacer 13 includes a transparent partition 131. When the spacer 13 is disposed between the rear surface 112 of the display panel 11 and the fingerprint identification module 12, the transparent partition 131 is disposed between the rear surface 112 of the display panel 11 and the fingerprint identification module 12, so that the fingerprint identification module 12 does not directly attach to the display panel 11, thereby ensuring that the fingerprint identification module 12 is parallel to the display panel 11, and the accuracy of the fingerprint identification of the fingerprint identification module 12 can be improved. In some embodiment, the transparent partition 131 has a shape of flat plate. The transparent partition 131 may be parallel to the rear surface 112. In other embodiments, an included angle between the transparent partition 131 and the rear surface is less than or equal to 5°.

Particularly, the transparent partition 131 is a rectangular thin plate. The transparent partition 131 has a certain strength. The transparent partition 131 may have a thickness of 0.2 mm. Thus the transparent partition 131 separates the rear surface 112 of the display panel 11 from the fingerprint identification module 12 by 0.2 mm. The transparent partition 131 may ensures that the fingerprint identification module 12 can emit the detecting light passing through the transparent partition 131 and the display panel 11, and may allow the detecting light after reflected to pass through the display panel 11 and the transparent partition 131 and finally arrive at the fingerprint identification module 12.

The first end surface 13a of the transparent partition 131 is attached to the rear surface 112 of the display panel 11 by heat-pressing in a low temperature, and the fingerprint identification module 12 is attached to the second end surface 13b of the spacer 13 by heat-pressing in a high temperature. Because the transparent partition 131 has a certain hardness, a region of the display panel 11 corresponding to the transparent partition 131 may not be fold, when the display panel 11 is flexibly bent, thereby preventing generating the wrinkles on the region of the display panel 11 corresponding to the transparent partition 131. There is no wrinkles formed on the transparent partition 131 although the fingerprint identification module 12 is attached to the spacer 13 by heat-pressing in a high temperature. Therefore, it is only necessary to ensure that the first end surface 13a is parallel to the second end surface 13b of the transparent partition 131, the fingerprint identification module 12 can be ensured to be parallel to the rear surface 112 of the display panel 11, thereby ensuring accurate detection and identification of fingerprint information. In other embodiments, the fingerprint identification module 12 can directly resist against the second end surface 13b of the transparent partition 131 by positional relationships of components in the mobile terminal 100.

Furthermore, as illustrated in FIG. 3, the spacer 13 further includes multiple protrusions 132. The protrusions 132 are disposed on an end surface of the transparent partition 131 facing the rear surface 112 of the display panel 11 (i.e. the first end surface 13a); and/or; the protrusions 132 are disposed on the one end surface of the transparent partition 131 facing the fingerprint identification module 12 (i.e. the second end surface 13b).

Because the protrusions 132 is disposed on the transparent partition 131, an area of contacting region of the transparent partition 131 and the rear surface 112 of the display panel 11 may be reduced, and/or an area of contacting region of the transparent partition 131 and the fingerprint identification module 12 is reduced. Therefore the rear surface 112 of the display panel 11 may be ensured to be parallel to the fingerprint identification module, and the accuracy of the fingerprint identification of the fingerprint identification module 12 can be improved.

Particularly, each of the protrusions 132 is a cylindrical protrusion, and the multiple protrusions 132 are respectively disposed on the first end surface 13a of the spacer 131 and the second end surface 13b of the spacer 131. Such that the area of contacting region of the transparent partition 131 and the rear surface 112 of the display panel 11 may be reduced obviously, as well as the area of contacting region of the transparent partition 131 and the fingerprint identification module 12. When the display panel 11 is bent during daily use, no large wrinkles are formed in the connection between the rear surface 112 of the display panel 11 and the transparent partition 131, which may avoid affecting the detection of fingerprint information.

Figure 4:
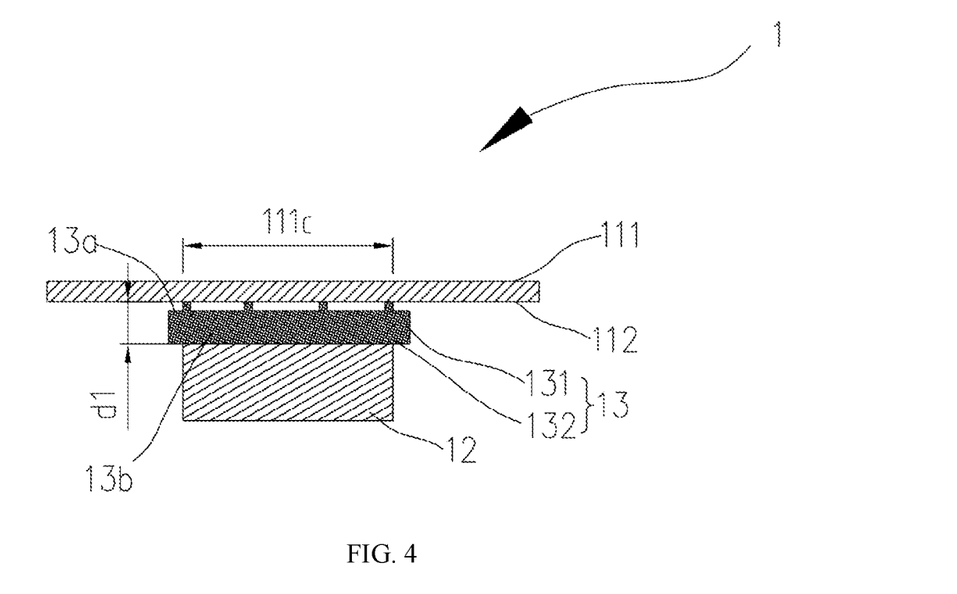
Figure 5:
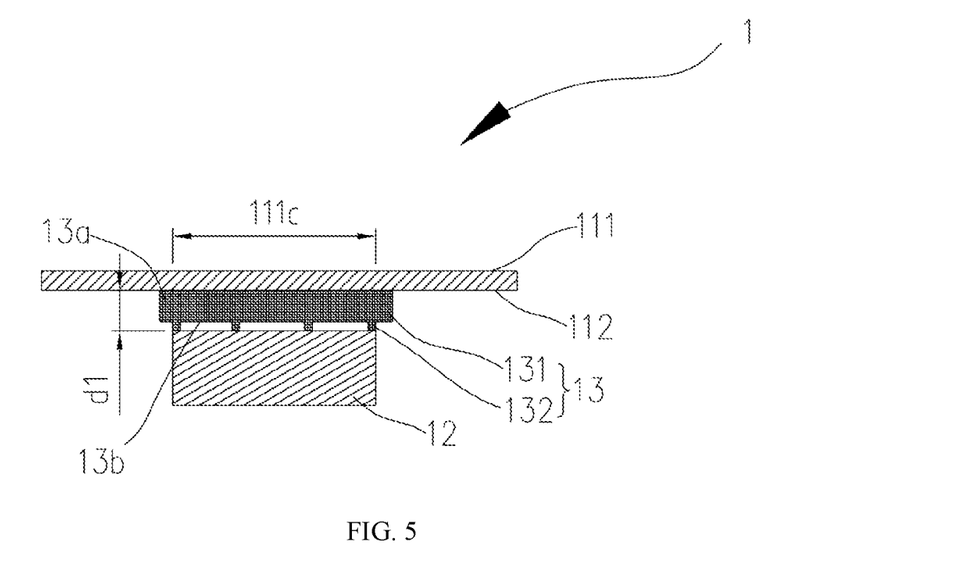

It can be understood that, in one embodiment, as illustrated in FIG. 4, the protrusions 132 may be disposed only on the first end surface 13a of the spacer 131. In other embodiments, as illustrated in FIG. 5, the protrusions 132 may be disposed only on the second end surface 13b of the spacer 131.

Figure 6:
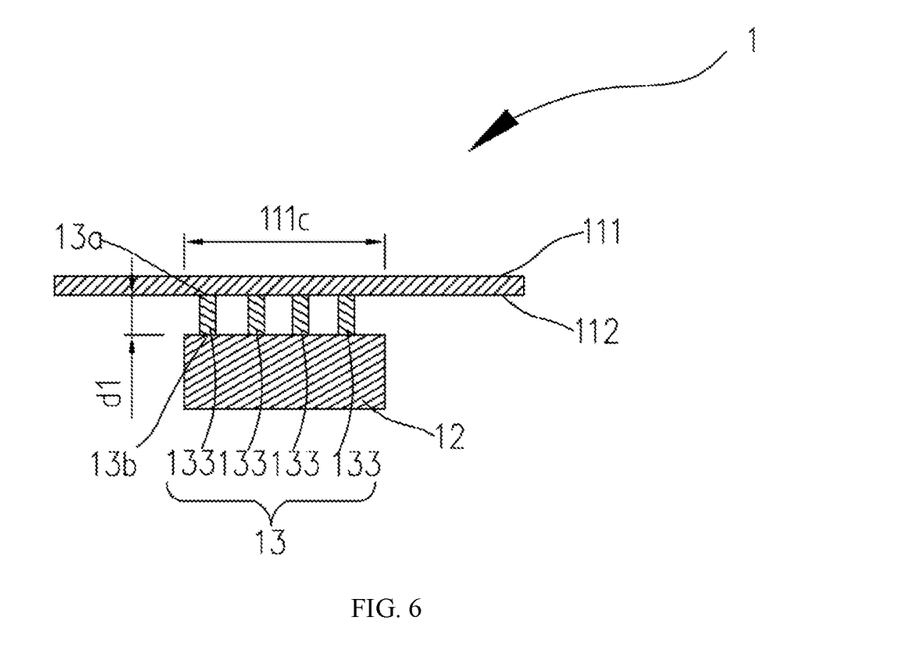
FIG. 6 illustrates a schematic cross-sectional view of the display device of FIG. 2, in accordance with another embodiment of the present disclosure.

In another embodiments, as illustrated in FIG. 6, the spacer 13 includes multiple transparent columns 133. The transparent columns 133 are sandwiched between the display panel 11 and the fingerprint identification module. The multiple transparent columns 133 are evenly spaced distributed.

Particularly, each of the transparent columns 133 has a shape of cylinder, and each of the transparent columns 133 has a diameter of 0.1 mm, and a height of 0.2 mm. Each of the transparent columns 133 includes a first end surface 13a close to the rear surface 112 of the display panel 11, and a second end surface 13b close to the fingerprint identification module 12. The first end surface 13a of the transparent columns 133 is attached to the rear surface 112 of the display panel 11 by heat-pressing in a low temperature, and the fingerprint identification module 12 is attached to the second end surface 13b of the transparent columns 133 by heat-pressing in a high temperature. Because the spacer 13 is formed by the multiple transparent columns 133, the spacer 13 is brought into contact with the display panel 11 and the fingerprint identification module 12 in point contact, an area of contacting region of the multiple transparent columns 133 and the rear surface 112 of the display panel 11 is small, as well as an area of contacting region of the multiple transparent columns 133 and fingerprint identification module 12. When the display panel 11 is bent during daily use, no large wrinkles are formed in the connection between the rear surface 112 of the display panel 11 and the multiple transparent columns 133, which may avoid affecting the detection of fingerprint information.

In assemble of the mobile terminal 100, the first end surface 13a of the spacer 13 is attached to the rear surface 112 of the display panel 11 by heat-pressing, and the fingerprint identification module 12 is fixed to the second end surface 13b of the spacer 13. Because the spacer 13 has a certain hardness, a region of the display panel 11 corresponding to the spacer 13 may not be bent to cause wrinkles when the display panel 11 is flexibly bent. There is no wrinkles formed on the spacer 13 although the fingerprint identification module 12 is attached to the spacer 13 by heat-pressing in a high temperature. Therefore, it is only necessary to ensure that the first end surface 13a is parallel to the second end surface 13b of the spacer 13, the fingerprint identification module 12 can be ensured to be parallel to the rear surface 112 of the display panel 11, thereby ensuring accurate detection and identification of fingerprint information. When the mobile terminal 100 is operated by the user, the user can press the fingerprint texture in the fingerprint receiving region 111c, thus the fingerprint identification module 12 may identify the fingerprint texture of the user. A region of the display panel 11 corresponding to the spacer 13 may not be bent when the mobile terminal 100 is bent. Therefore the fingerprint identification module 12 can be ensured to be parallel to the display panel 11, thereby ensuring accurate detection and identification of fingerprint information.

In the display device 1 and the mobile terminal 100 provided by the present disclosure, the fingerprint identification module 12 is disposed adjacent to the rear surface 112 of the display panel 11, which allows the user to input fingerprint information through the display region 111a of the display panel 11. Thus there is no necessary to provide a special region on the non-display region 111b of the display surface 111 to receive the finger information. Thus an area of the non-display region 111b may be smaller than a traditional one that having a special region to receive the finger information. Thereby a ratio of the display region 111a to the display surface 111 of the mobile terminal 100 is increased. The fingerprint identification module 12 is disposed apart from the rear surface 112 of the display panel 11 by the spacer 13, so that the fingerprint identification module 12 does not directly contact with the display panel 11 to avoid affecting the detection of fingerprint information, that is, the accuracy of fingerprint identification is improved.

Figure 7:
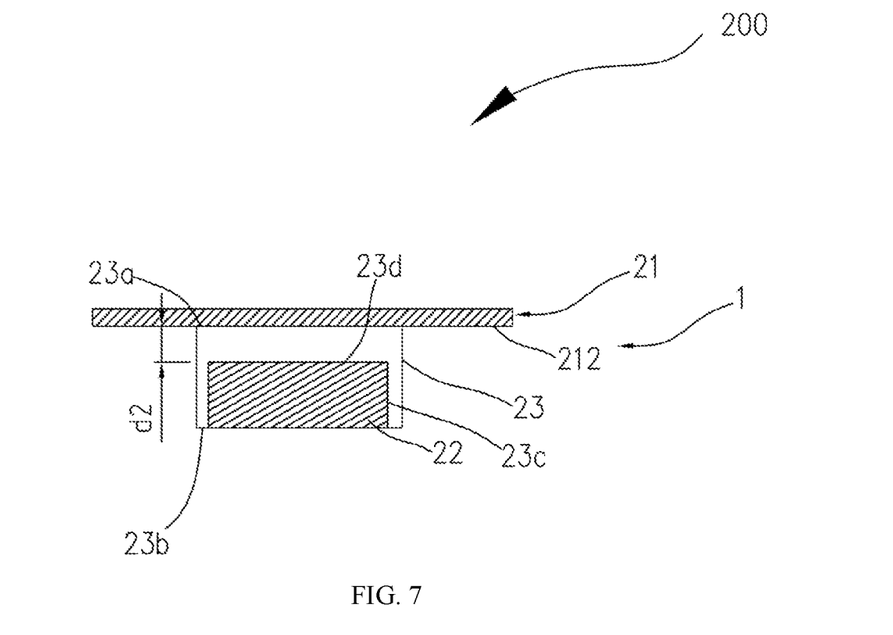
FIG. 7 illustrates a schematic view of a display panel, in accordance with still another embodiment of the present disclosure.

As illustrated in FIG. 7, a mobile terminal 200 is provided, in accordance with a second embodiment of present disclosure. The mobile terminal 200 is substantially the same as the mobile terminal 100 of the first embodiment, except that an end surface (herein defined as a second end face 23b) of the spacer 23 facing the fingerprint identification module 12 defines a recess 23c, and the fingerprint identification module 22 is received in the recess 23c of the spacer 23.

Particularly, the spacer 23 is a rectangular block. The recess 23c of the spacer 23 is substantially the same size as the fingerprint identification module 22. A bottom surface 23d of the recess 23c is parallel to an end surface of to the spacer 23 facing the rear surface 212 of the display panel 21 (herein the end surface is defined as a first end surface 23a). So that the fingerprint identification module 22 is still parallel to the rear surface 212 of the display panel 21 when the fingerprint identification module 22 is received in the recess 23c, to ensure a better fingerprint identification accuracy. A distance between the first end surface 23a of the spacer 23 and the bottom surface 23d of the recess 23c equals to a distance d2 between the fingerprint identification module 22 and the rear surface 212 of the display panel 21. The fingerprint identification module 22 is accommodated in the recess 23c of the spacer 23, thus a space inside the mobile terminal 200 may be saved, and the structure of the mobile terminal 200 may be further optimized.

It can be understood that, connection manners, connection structures and manners of the spacer 13 and the rear surface 112 of the display panel 11 in the first embodiment of the present disclosure, may be applied in the second embodiment, and details are not described herein.

Figure 8:
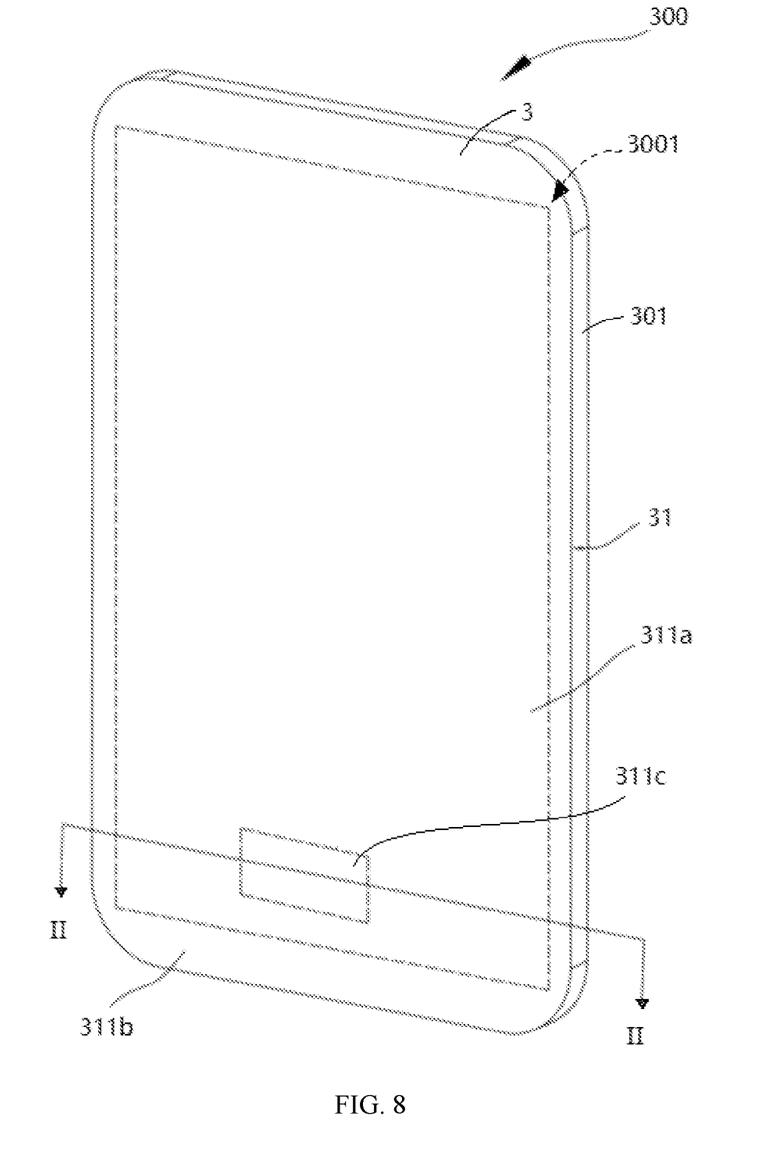
FIG. 8 illustrates a schematic view of a mobile terminal, in accordance with another embodiment of the present disclosure.
Figure 9:
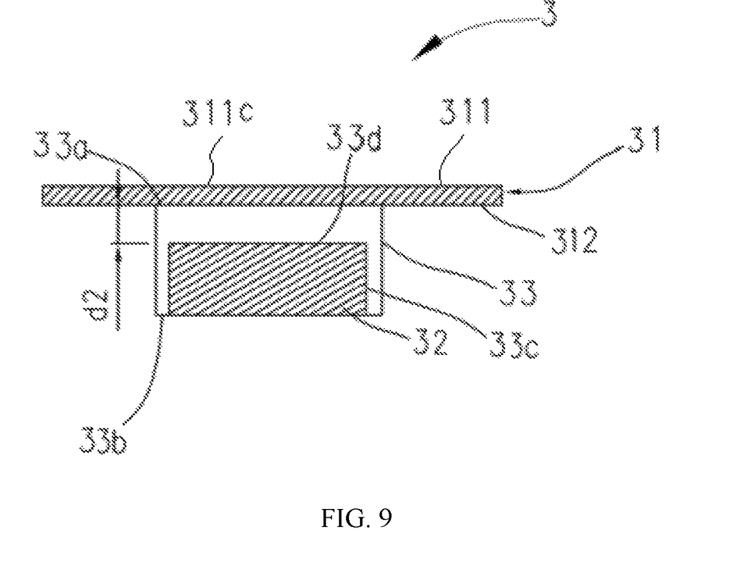
FIG. 9 illustrates a cross-sectional view of a display device of the mobile terminal of FIG. 8, taken along a line II-II.

As illustrated in FIG. 8 and FIG. 9, a mobile terminal 300 is provided, in accordance with an embodiment of the present disclosure. The mobile terminal 300 is similar to the mobile terminal 100 and the mobile terminal 200.

In the illustrated embodiment, the mobile terminal 300 includes a housing 301 and a display device 3. The display device 3 is connected to the housing 301. The display device 3 includes a display panel 31, a fingerprint identification module 32, and a spacer 33. The display panel 31 is attached to a side of the housing 301, and the display panel 31 and the housing 301 corporately define a receiving cavity 3001. The fingerprint identification module 32 and the spacer 33 is disposed in the receiving cavity 3001.

The display panel 31 includes a display surface 311 and a rear surface 312 opposite to the display surface 311. The rear surface 312 is facing the receiving cavity 3001. The display surface 311 includes a display region 311a for displaying images. The fingerprint identification module 32 is received in the housing 301. The spacer 13 is attached to the rear surface 312. The spacer 33 is sandwiched between the display panel 31 and the fingerprint identification module 32, and configured to separate the fingerprint identification module 32 from the display panel 31. The fingerprint identification module 32 is configured to identify fingerprint information received by the display region 311a.

In some embodiments, the display panel 31 is transparent. For example, the display panel 31 may be a transparent liquid crystal display or an organic light emitting display. Such that the fingerprint identification module 32 can emit a detecting signal to pass through the display region 311a.

In other embodiment, at least partial portion of the display panel 31 is transparent. For example, the display region 311a may define a fingerprint receiving region 311c to receive fingerprint information of a user. The fingerprint receiving region 311c is light-transmitting for allow a detecting signal to pass through. In some embodiments, the fingerprint receiving region 311c is transparent and allows the user to touch and input the fingerprint information. In some embodiments, the fingerprint receiving region 311c is transparent while other regions of the display surface 311 is non-transparent. For example, the fingerprint receiving region 311c may include transparent electrodes to display images, and other regions of the display surface 311 may include ordinary non-transparent electrodes to display images. Thus a quality of displaying of the display panel 31 is better. In some embodiments, the fingerprint receiving region 311c is translucent. For example, the fingerprint receiving region 311c may be translucent with any colors such as black, or gray, for allowing light to pass through but not transparent.

In some embodiments, the display panel 31 further includes a non-display region 311b in contact with the display region 311a, the display region 311a is at least partially enclosed by the non-display region 311b. The non-display region 311b is configured to connect to the housing 301.

The spacer 33 is attached to the rear surface 312 corresponding to the fingerprint receiving region 311c. The spacer 33 is a transmission medium for allowing the detecting signal emitted by the fingerprint identification module 32 to pass through. In some embodiments, the spacer 33 may be translucent or transparent when the detecting signal is light, optical signal, or ultrasonic signal. For example, the spacer 33 may be translucent with any colors such as black, or gray, for allowing light to pass through but not transparent.

The spacer 33 is attached to the rear surface 312 by heat-pressing with a first temperature, and the fingerprint identification module 32 is attached to the spacer 33 by heat-pressing with a second temperature; the second temperature is higher than the first temperature. Thus the display panel 31 can be protected from processing by high temperature.

In some embodiments, the spacer 33 may include a first end surface 33a and a second end surface 33b opposite to the first end surface 33a. The first end surface 33a of the spacer 33 faces the rear surface 312. The second end surface 13b is away from the rear surface 312. An included angle between the first end surface 33a and the second end surface 33b is less than or equal to 5°

In some embodiments, the spacer 33 may define a recess 33c in the second end surface 33b. The fingerprint identification module 32 is received in the recess 33c. The fingerprint identification module 32 may be entirely accommodated in the recess 33c. A surface of the fingerprint identification module 32 away from the display panel 31 is flush with the second end surface 33b. In other embodiments, the fingerprint identification module 32 may be partially accommodated in the recess 33c, and the surface of the fingerprint identification module 32 away from the display panel 31 may protrude with respect to the second end surface 33b.

The spacer may further include a bottom surface 33d in the recess 33c. The bottom surface 33d is parallel to the first end surface 33a, and the fingerprint identification module 32 is stacked on the bottom surface 33c.

In some embodiments, the fingerprint identification module 32 may be an optical fingerprint identification device or an ultrasonic fingerprint identification device. The fingerprint identification module 32 is configured to emit the detecting signal to pass through the fingerprint receiving region 311c and the spacer 33. It can be understood that, connection manners, connection structures and manners of the spacer 13 and the rear surface 112 of the display panel 11 in the first embodiment of the present disclosure, may be applied in the third embodiment, and details are not described herein.

The above is a preferred embodiment of the present disclosure, and it should be noted that those skilled in the art can also make several improvements and retouchings without departing from the principles of the present disclosure. These improvements and retouchings are also considered as the scope of protection for the disclosure.

What is claimed is:

1. A display device, comprising:
   a display panel, having a display surface and a rear surface opposite to the display surface; the display surface defining a display region for displaying images;
   a fingerprint identification module, spaced apart from the rear surface, and configured to identify fingerprint information received by the display region; and
   a spacer, attached to the rear surface and sandwiched between the display panel and the fingerprint identification module; wherein the spacer is a transmission medium for allowing a detecting signal that is emitted by the fingerprint identification module to pass through, and allowing the detecting signal after being reflected by an object outside to pass through;
   wherein the spacer comprises:
      a transparent partition disposed between the display panel and the fingerprint identification module; and
      a plurality of protrusions disposed on an end surface of the transparent partition, the plurality of protrusions facing the rear surface of the display panel or the fingerprint identification module.

2. The display device of claim 1, wherein the display panel is a flexible display panel.

3. The display device of claim 1, wherein the display region defines a fingerprint receiving region therein, the fingerprint receiving region is light-transmitting and configured to receive the fingerprint information.

4. The display device of claim 3, wherein the display panel is a transparent liquid crystal display or an organic light emitting display; the fingerprint identification module is an optical fingerprint identification device or an ultrasonic fingerprint identification device; and the fingerprint identification module is configured to emit the detecting signal to pass through the fingerprint receiving region.

5. The display device of claim 3, wherein the display panel further comprises a non-display region in contact with the display region, the display region is at least partially enclosed by the non-display region.

6. The display device of claim 1, wherein the transparent partition is a rectangular plate.

7. The display device of claim 1, wherein the transparent partition is a flat plate, an included angle between the transparent partition and the rear surface is less than or equal to 5°.

8. The display device of claim 7, wherein the transparent partition is parallel to the rear surface.

9. The display device of claim 1, wherein the spacer comprises a first end surface facing the rear surface and a second end surface opposite to the first end surface; the plurality of protrusions are only disposed on the first end surface, the spacer defines a recess in the second end surface; and the fingerprint identification module is received in the recess.

10. The display device of claim 9, wherein the fingerprint identification module is entirely accommodated in the recess; and a surface of the fingerprint identification module away from the display panel is flush with the second end surface.

11. The display device of claim 9, wherein the spacer further comprises a bottom surface in the recess; the bottom surface is parallel to the first end surface; and the fingerprint identification module is stacked on the bottom surface.

12. The display device of claim 1, wherein the spacer comprises a first end surface facing the rear surface and a second end surface opposite to the first end surface; the plurality of protrusions are disposed on the first end surface, the fingerprint identification module is in contact with the second end surface; an included angle between the first end surface and the second end surface is less than or equal to 5°.

13. The display device of claim 1, wherein a distance between the fingerprint identification module and the rear surface is greater than or equal to 0.1 mm.

14. A mobile terminal comprising:
   a housing,
   a display panel, connected to the housing; wherein the display panel and the housing corporately define a receiving cavity; the display panel has a display surface and a rear surface facing the receiving cavity and opposite to the display surface; and the display surface defines a display region for displaying images;
   a fingerprint identification module, disposed in the receiving cavity and spaced apart from the rear surface, and configured to identify fingerprint information received by the display region; and
   a spacer, attached to the rear surface and sandwiched between the display panel and the fingerprint identification module; wherein the spacer is a transmission medium for allowing a detecting signal emitted by the fingerprint identification module to pass through;
   wherein the spacer comprises:
      a transparent partition disposed between the display panel and the fingerprint identification module; and
      a plurality of protrusions disposed on an end surface of the transparent partition, the plurality of protrusions facing the rear surface of the display panel or the fingerprint identification module.

15. The mobile terminal of claim 14, wherein the display panel is flexible.

16. The mobile terminal of claim 14, wherein the display region defines a fingerprint receiving region therein, the fingerprint receiving region is light-transmitting and configured to receive the fingerprint information.

17. The mobile terminal of claim 16, wherein the display panel is a transparent liquid crystal display or an organic light emitting display; the fingerprint identification module is an optical fingerprint identification device or an ultrasonic fingerprint identification device.

18. The mobile terminal of claim 14, wherein the transparent partition is a flat plate, an included angle between the transparent partition and the rear surface is less than or equal to 5°.

19. A display device comprising:
- a display panel, having a display surface and a rear surface opposite to the display surface; the display surface defining a display region for displaying images;
- a spacer, attached to the rear surface and corresponding to the display region; and
- a fingerprint identification module, attached to a side of the spacer far away from the rear surface; wherein at least a partial portion of the display region is light-transmitting and the spacer is a transmission medium for a detecting signal emitted by the fingerprint identification module to pass through;

wherein the spacer comprises:
- a transparent partition disposed between the display panel and the fingerprint identification module, the transparent partition comprising a first end surface facing the rear surface and a second end surface facing the fingerprint identification module; and
- a plurality of protrusions disposed on the first end surface and the second end surface of the transparent partition.

20. The mobile terminal of claim 19, wherein an included angle between the first end surface and the second end surface is less than or equal to 5°.

* * * * *